United States Patent [19]
Savoie et al.

[11] Patent Number: 5,895,436
[45] Date of Patent: Apr. 20, 1999

[54] VEHICLE TRACKING SYSTEM USING CELLULAR NETWORK

[76] Inventors: Paul-André Roland Savoie, 501 de Gaspé, Ile des Soeurs, Quebec, Canada, H3E 1E7; André Eric Boulay, 54 Daudelin, Kirkland, Quebec, Canada, H9J 2S6

[21] Appl. No.: 08/638,215

[22] Filed: Apr. 26, 1996

[51] Int. Cl.⁶ ............................. G01S 13/78; G01S 15/74
[52] U.S. Cl. ........................... 701/214; 701/209; 342/44; 342/457; 342/459
[58] Field of Search .................. 701/30, 207, 209, 701/214, 215; 342/44, 457, 458, 459

[56] References Cited

U.S. PATENT DOCUMENTS

| | | | |
|---|---|---|---|
| 3,680,121 | 7/1972 | Anderson et al. | 343/112 |
| 4,596,988 | 6/1986 | Wanka | 342/457 |
| 4,651,156 | 3/1987 | Martinez | 342/457 |
| 4,818,998 | 4/1989 | Apsell et al. | 342/44 |
| 4,891,650 | 1/1990 | Sheffer | 342/457 |
| 4,908,629 | 3/1990 | Apsell et al. | 342/457 |
| 5,021,794 | 6/1991 | Lawrence | 342/457 |
| 5,055,851 | 10/1991 | Sheffer | 342/457 |
| 5,208,756 | 5/1993 | Song | 364/449 |
| 5,218,367 | 6/1993 | Sheffer et al. | 342/457 |
| 5,293,642 | 3/1994 | Lo | 455/33.1 |
| 5,299,132 | 3/1994 | Wortham | 364/460 |
| 5,515,043 | 5/1996 | Berard et al. | 340/988 |
| 5,550,551 | 8/1996 | Alesio | 342/457 |
| 5,592,180 | 1/1997 | Yokev et al. | 342/457 |
| 5,731,785 | 3/1998 | Lemelson et al. | 342/457 |

OTHER PUBLICATIONS

Promotional Literature distributed by Rankin Research of Jul. 1996.

*Primary Examiner*—V Lissi Mojica
*Attorney, Agent, or Firm*—Swabey Ogilvy Renault

[57] ABSTRACT

A vehicle tracking method and system using the cellular network infrastructure is disclosed. A cellular transceiver which is installed in a vehicle that requires tracking, operates on a continuous standby mode to remain constantly accessible to the cellular security provider. The cellular transceiver is turned to an active mode when tracking of the vehicle is initiated. The general location of the stolen vehicle can be determined by paging the cellular transceiver located in the stolen vehicle to identify one or more cell sites located near the stolen vehicle. The information is then relayed to a tracking vehicle which makes use of a radio direction finder to obtain an accurate bearing on the location of the stolen vehicle. In another embodiment, the tracking vehicle which is provided with a radio direction finder can determine using a global positioning system receiver its location with respect to one or more cell sites identified as being close to the stolen vehicle such that the tracking vehicle can quickly travel to the area identified by the selected cell sites.

10 Claims, 8 Drawing Sheets

VEHICLE TRACKING SYSTEM USING CELLULAR NETWORK

FIELD OF THE INVENTION

This invention relates to vehicle tracking systems, but more particularly, to a vehicle tracking system which makes use of the existing cellular network infrastructure.

BACKGROUND OF THE INVENTION

Various systems have been suggested to date to enable the locating and tracking of stolen or missing vehicles. These systems are generally categorized in two groups, namely those which make use of existing police radio communication infrastructures and those which make use of existing cellular network infrastructures.

U.S. Pat. Nos. 4,818,998 and 4,908,629 which both issued to Apsell et al are directed to the former. That is, Apsell et al teach the use of an apparatus and method for tracking vehicles equipped with computer-registered transponders which may be located or tracked by appropriately equipped police direction-finding vehicles. The police tracking the stolen vehicles home in on periodic transponder reply radio transmissions which are activated by command activation signals.

The problem associated with such systems, is that special police radio infrastructures are required in order to track and locate the stolen vehicles. In addition, unless the police vehicle is located in the same general area as the stolen vehicle, it is unlikely that the stolen vehicle can be located in view of the limited range of transmission between the stolen vehicle and police vehicle as well as any broadcast towers used with this invention. Also, once a car is removed from a city provided with this infrastructure, it will likely never be found since the system operates solely in a city having the specified system.

Because of their wide service area, cellular networks offer advantages over the aforementioned tracking systems. A vehicle tracking system making use of a cellular network is disclosed in U.S. Pat. No. 5,299,132. In this system, a cellular telephone in a vehicle is interrogated to obtain location information received by the cellular phone in an overhead message stream transmitted from the cellular network. Once a reply to the interrogation is received at the host controller, the location of the vehicle is displayed. A microprocessor at the cellular phone checks the serial identification number and a database for dial-out procedure to the host controller upon being interrogated to obtain location information.

Yet another system for tracking vehicles which makes use of a cellular network is disclosed in U.S. Pat. No. 5,208,756. With this system, a small hidden device located in the vehicle is activated through DTMF signals transmitted from any telephone station. Upon activation, the device determines the power at which normally transmitted control channels are received from several base stations of the network. Based upon these determinations, the device then calculates the distance between the vehicle and each of the base stations and, using triangulation or arculation, determines the location of the vehicle. The location information is then transmitted through a voice synthesizer back to the telephone station from which the activation signal is received. The location information is also transmitted digitally to a central station where the position of the vehicle is displayed on a computer screen along with a graphical representation of a map of the region served by the cellular telephone network.

U.S. Pat. No. 5,218,367 makes use of the cellular network by sending an emergency message transmission to a remote monitoring station in the event a theft sensor is activated on the vehicle. The monitoring system then detects the cell site identification codes from adjacent cellular transmitter and provides a message including the vehicle identification, cell site identification and signal RSSI. A computer located at a central station then provides a determination of the location of the stolen vehicle based on the information received.

U.S. Pat. Nos. 5,055,851 and 4,891,650 make use of the cellular network in a similar fashion. That is, the stolen vehicle sends an identification code and RSSI level to the closest cell site. The active cell site which receives the information reports the theft to the cellular MTSO and the MTSO transmits the information to an alarm station which identifies the vehicle and cell site.

A problem associated with the aforementioned systems is that in most instances, cell sites located in metropolitan areas make use of low-powered 120° directional antennas to cover a densely populated and developed area which may have a large number of buildings, highways, side streets, parking lots, garages and other facilities where the thief may be able to hide the vehicle. Thus, although the aforementioned systems may be able to locate the general location of the vehicle with respect to a cell site antenna, the probability of locating the vehicle in short order is still fairly small and mostly based on luck. Furthermore, cell sites located in urban areas cover very large areas with high-powered, omnidirectional antennas, making location finding even more difficult since the antennas are omnidirectional as opposed to sectorized. In both cases, buildings, underground parking lots, mountains and other obstacles often cause the towers to report false RSSI readings to the MTSO.

Yet another problem associated with the aforementioned systems is that most of the techniques require in some form or another modification to the existing cellular infrastructure software to enable a cellular service provider to track and monitor movement of a stolen vehicle. In most instances, cellular service providers are in the majority reluctant to make any modification to their software for the purpose of tracking stolen vehicles.

A need therefore exists for providing a vehicle tracking method and system using existing cellular network infrastructure which can overcome the problems associated with the prior art.

Accordingly, it is an object of the present invention to provide a vehicle tracking method and system which make use of the existing cellular network infrastructure, but wherein the cellular service provider is not required to modify its software in order to identify the general location of a stolen vehicle.

Another object of the present invention is to provide a vehicle tracking method and system which make use of the existing cellular network infrastructure, wherein a tracking vehicle making use of a radio signal direction finder is used to quickly obtain a more accurate indication of the location of the stolen vehicle can be obtained.

Another object of the present invention is to provide a vehicle tracking method and system which make use of the existing cellular network infrastructure, wherein a stolen vehicle can be tracked by keeping a voice channel open between the cellular network and a locating cellular transceiver installed in the stolen vehicle.

Yet another object of the present invention to provide a vehicle tracking method and system using the cellular network infrastructure, wherein the general location of the stolen vehicle can be determined by paging a cellular transceiver located in the stolen vehicle to permit identification by the MTSO of one or more cell sites located near the stolen vehicle and relaying the information to a tracking vehicle which makes use of a radio direction finder to obtain an accurate bearing on the location of the stolen vehicle.

Yet another object of the present invention to provide a vehicle tracking method and system which make use of the existing cellular network infrastructure, wherein the cellular transceiver which is installed in a vehicle that requires tracking, operates on a continuous standby mode for tracking its general location and is turned to an active mode when tracking of the vehicle is initiated.

Yet another object of the present invention is to provide a method and system of locating a stolen vehicle using existing cellular infrastructure, wherein a tracking vehicle provided with a radio direction finder can determine using a global positioning system receiver its location with respect to one or more cell sites identified as being close to said stolen vehicle such that the tracking vehicle can quickly travel to the area identified by the selected cell sites.

In accordance with an embodiment of the present invention, there is provided a method of locating a stolen vehicle provided with a locating cellular transceiver, using the existing cellular network infrastructure, comprising the steps of:

(a) receiving an indication that said vehicle has been stolen;

(b) paging said locating cellular transceiver;

(c) maintaining an open voice channel with said locating cellular transceiver of said stolen vehicle;

(d) estimating the coordinates of the vehicle location based on the location of a cell site communicating with said locating cellular transceiver;

(e) determining the location of a search vehicle with respect to said one or more cell sites;

(f) monitoring said open voice channel from said search vehicle; and (g) locating said stolen vehicle based on the direction of arrival of RF signals emitted by said stolen vehicle and received at said search vehicle.

In accordance with a further embodiment of the invention, there is provided a system for locating a stolen vehicle provided with a locating cellular transceiver, said system operating using the existing cellular network infrastructure, comprising:

(a) means for receiving an indication that said vehicle has been stolen;

(b) means for paging said locating cellular transceiver;

(c) cellular radio means for maintaining an open voice channel with said locating cellular transceiver of said stolen vehicle;

(d) means for estimating the coordinates of the vehicle location based on the location of one or more cell sites communicating with said locating cellular transceiver;

(e) positioning means for determining the location of a search vehicle with respect to said one or more cell sites;

(f) radio means for monitoring said open voice channel from said search vehicle; and (g) radio location finder means for locating said stolen vehicle based on the direction of arrival of RF signals emitted by said stolen vehicle and received at said search vehicle.

BRIEF DESCRIPTION OF THE DRAWINGS

The invention will be better understood by an examination of the following description, together with the accompanying drawings, in which:

Fig. 1b illustrates generally how a vehicle is monitored within the cellular communication system of Fig. 1a;

FIG. 2a is an illustration of a typical setting of a cell site with 120° sectorization in a metropolitan area;

FIG. 4b is a diagram illustrating the location of direction finding, GPS and transceiver antennae used with the system of FIG. 4a.

DESCRIPTION OF THE PREFERRED EMBODIMENTS

Figure 1A:
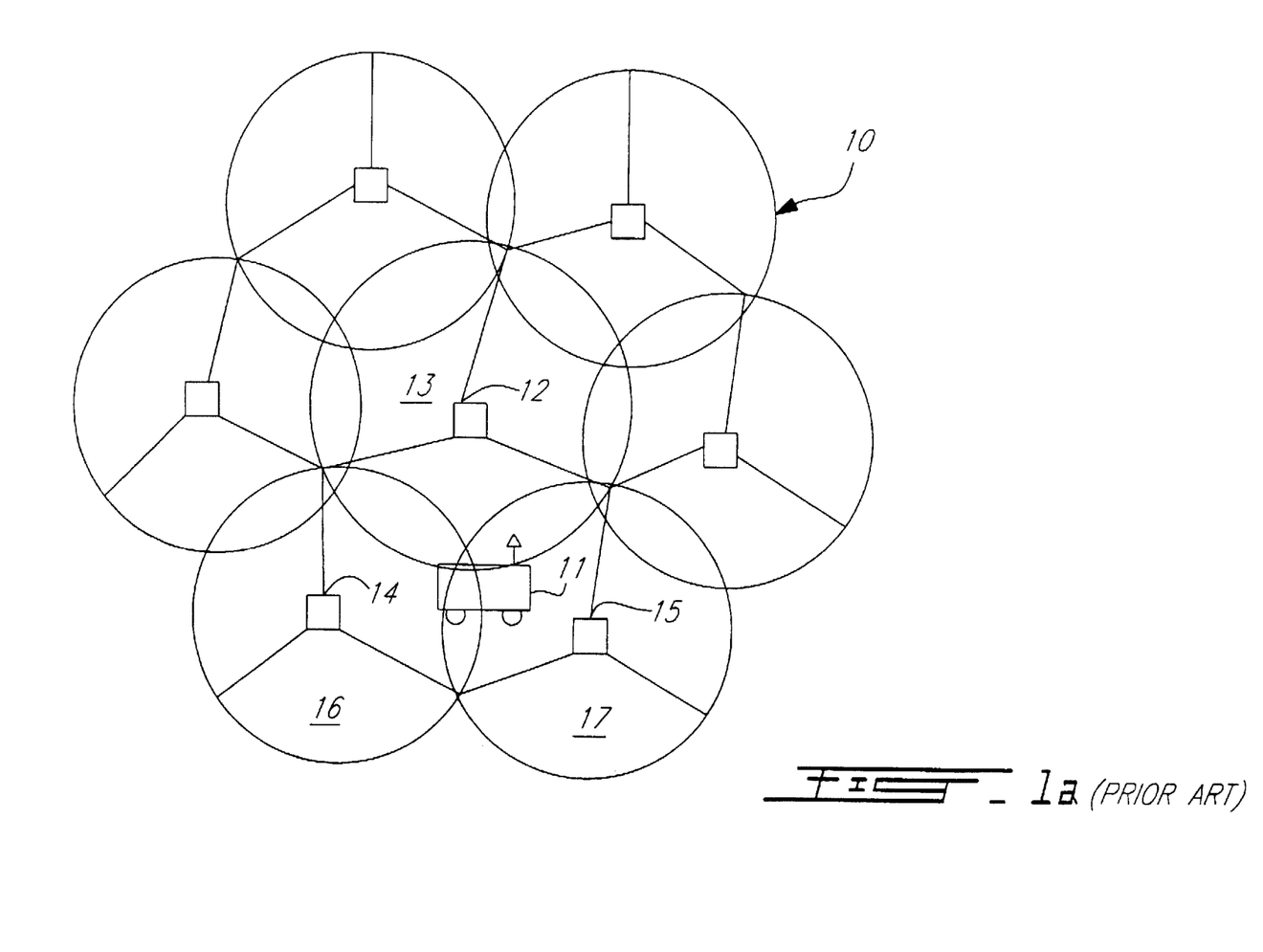
Fig. 1a illustrates a typical cluster of cells in a cellular communication system.
Figure 1B:
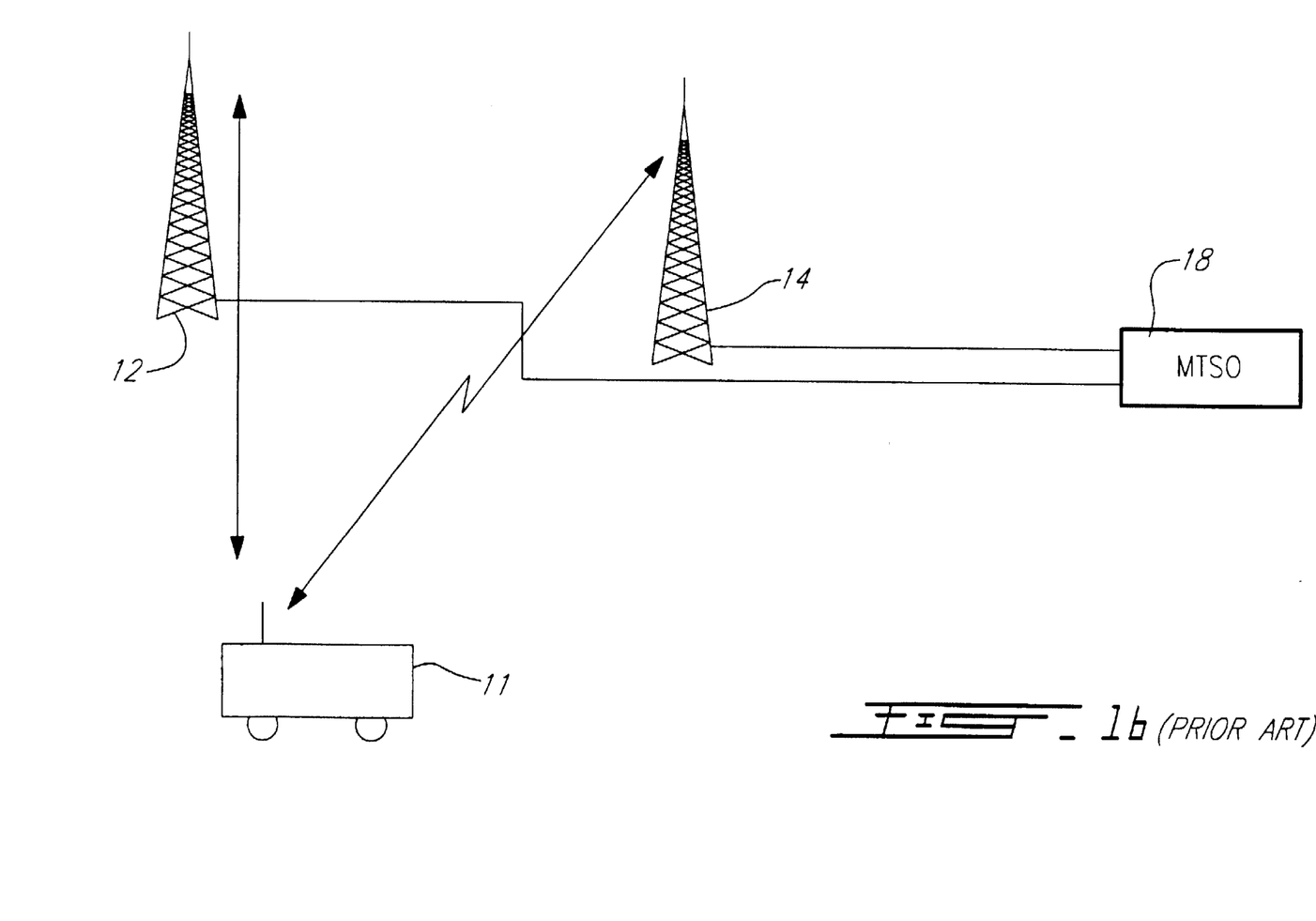
Figure 2B:
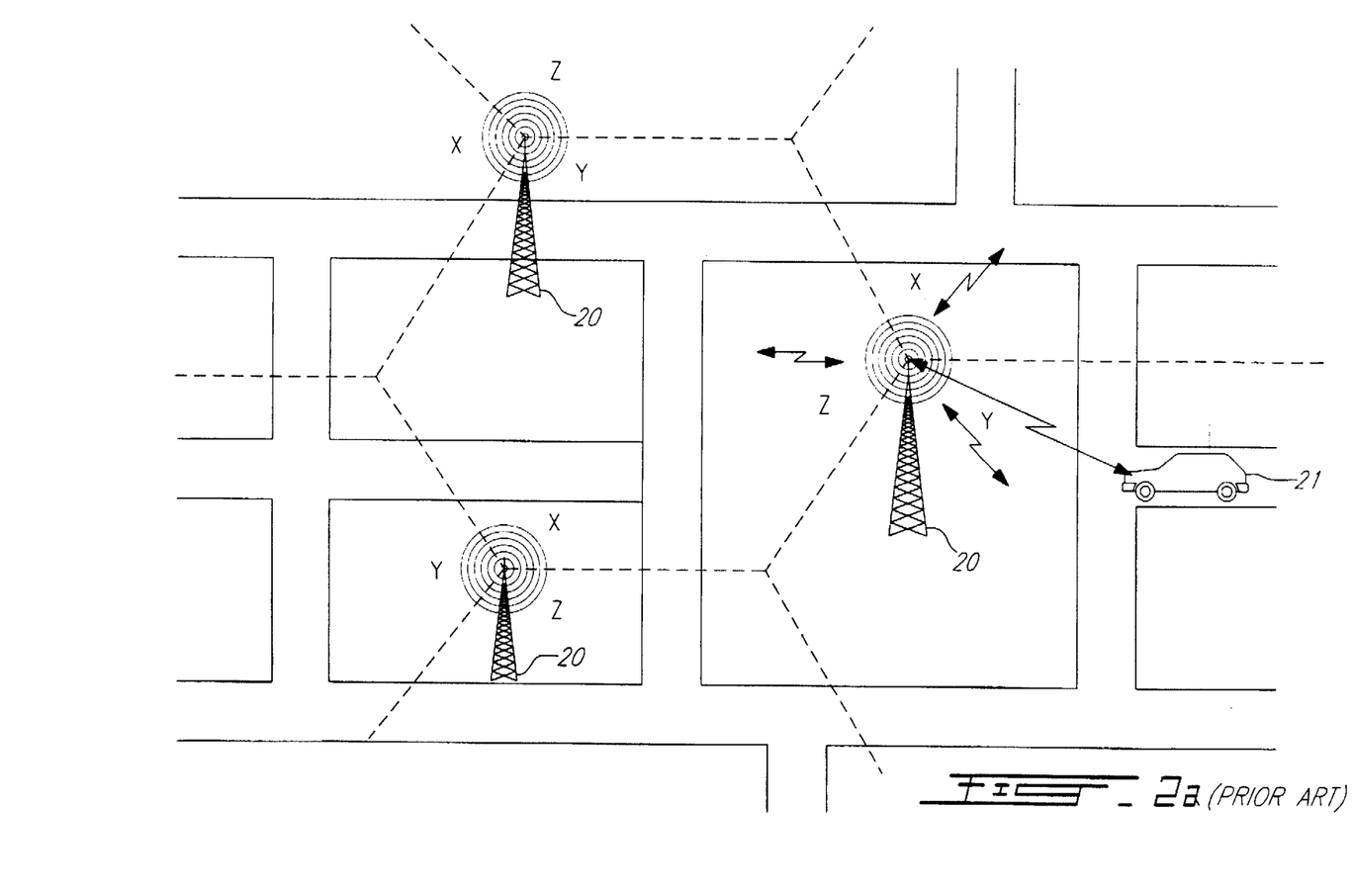
FIG. 2b is an illustration of a typical setting of a cell site with an omnidirectional antenna in an urban area.

Referring now to FIG. 1, we have shown a typical cell cluster 10 forming part of a larger cellular network (not shown). This particular cluster is commonly known as a 7-cell pattern. Either these 120° segmented cells (FIG. 2a) or tiered omnidirectional cells (FIG. 2b) are used. In the example of Fig. 1a, a mobile station 11 is being served by base station 12 of cell 13. Base stations 14 and 15 of cells 16 and 17 respectively, are also within radio range of mobile station 11. As shown in Fig. 1b, as the mobile 11 travels, a request for signal strength measurements will be sent by the serving station 12 to neighbouring cells, in this case cell 14. If the strongest received signal strength indication (RSSI) is received from a neighbouring base station, such as base station 14, the serving base station 12 will select the neighbouring base station as the hand-off target base station, i.e. the next base station to serve the mobile base station. The cellular service of vehicle 11, as it moves from cell site to cell site, is of course controlled by a mobile telephone switching office 18 to provide the best service for the cellular user.

When a cellular transceiver is used for tracking a stolen vehicle in a metropolitan area, such as shown in FIG. 2a, a densely populated and developed area covering several streets and buildings is serviced by the coverage area of each sector of a cell site 20 communicating with a stolen vehicle 21. Although a general estimate of the location of stolen vehicle 21 can be determined, say, within a 120° area of a cellular cluster such as shown in FIG. 2a, it becomes extremely difficult to pinpoint the exact location of vehicle 21 which may be located in any one of the streets or within a building within the vicinity of the cell site 20. Thus, even though vehicle 21 might be in communication range with cell site 20, the radio coverage of cell site 20 may cover several blocks within a metropolitan area. Thus, even if a tracking or search vehicle such as a police car or other private security service company is able to locate the stolen vehicle 21 generally within the coverage area of one sector of cell site 20, it may be difficult or even impossible to exactly pinpoint the location of the stolen vehicle, especially if the vehicle is located within a closed garage for disassembly.

Figure 3A:
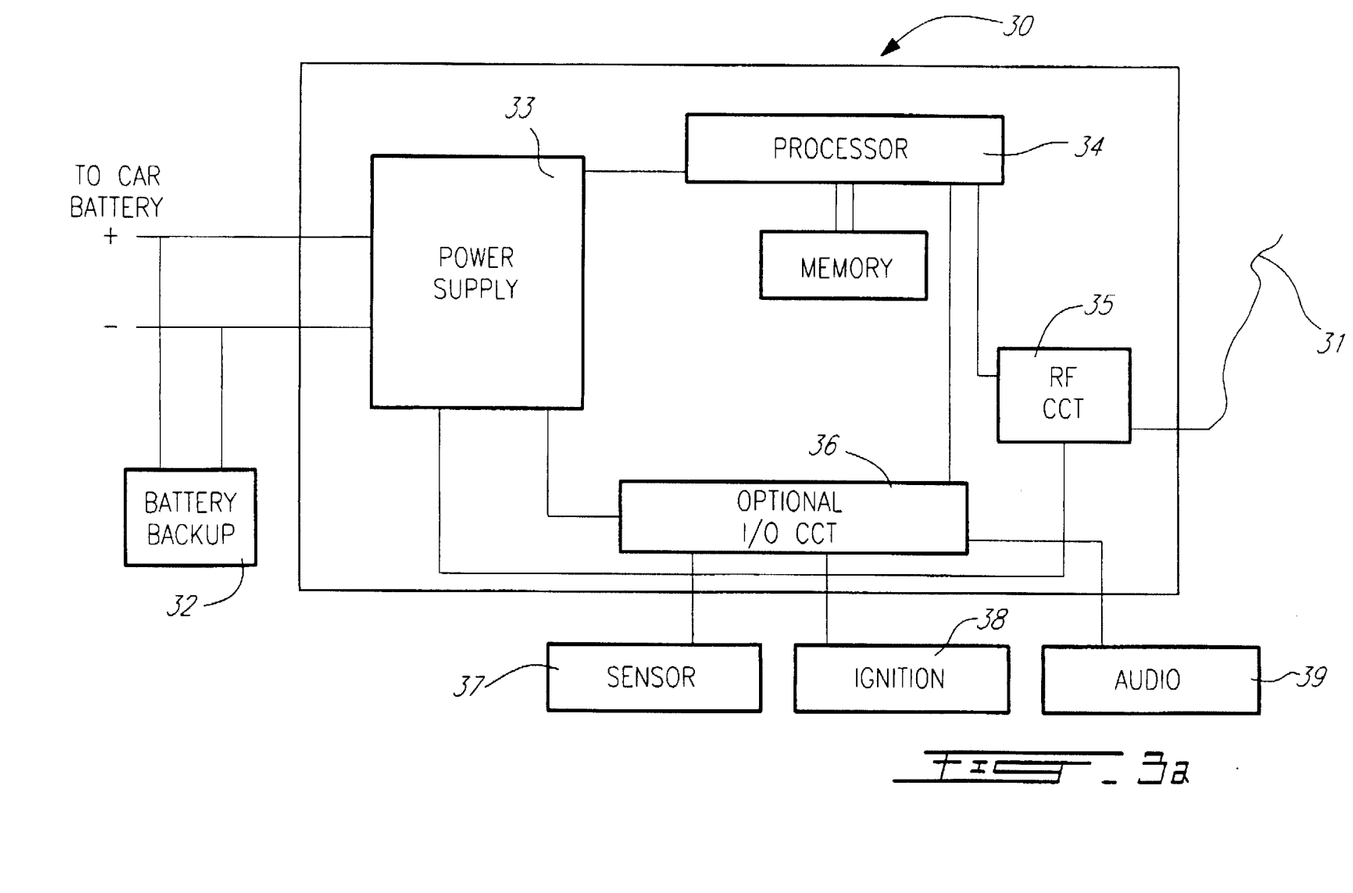
FIG. 3a is a block diagram of the locating cellular transceiver of the present invention.

Referring now to FIG. 3a, we have shown a block diagram of a locating cellular transceiver for installation in a vehicle. The transceiver 30 should preferably be installed in a hidden location to prevent the unit from being readily noticed and removed by a potential thief. Antenna 31 need not be connected to the standard 3 dB whip-type antenna normally mounted on a window the vehicle. In particular, antenna 31 is adapted to be inconspicuously laid out inside the vehicle. The cellular transceiver 30 is connected directly to a constant 12 volt power source, such as the car battery and may be provided with a back-up battery 32 to prevent the transceiver 30 from being disabled if the cables to the car battery are disconnected. The cellular transceiver 30 is designed to operate full-time in a standby mode. The cellular transceiver 30 is designed to draw a minimum amount of current such that it can be maintained in a standby mode continuously once installed. Similarly, even in an active mode, when the transceiver is required to operate at higher transmit power, very little current will be drawn from the car battery. The cellular transceiver 30 is designed to operate in the same way as a standard telephone transceiver in that it will respond to queries from the cellular network at periodic intervals to provide the network with an indication of its operating status. The cellular transceiver 30 will respond to standard commands and queries from the network such as when the RSSI level with respect to a particular cell site is required. It can also receive commands from the cellular network if the transceiver transmit power level needs to be changed, such as when the cellular transceiver is paged. The power level can vary from a minimum of 0.2 watts to a maximum of 0.6 watts such as is currently used in standard cellular telephones. The locating cellular transceiver 30 is provided with standard components, such as power supply 33, memory and processor circuit 34, RF circuit 35 and, if required, an optional IO circuit 36. Optional IO circuit 36 can be provided to connect a variety of sensors 37 to detect that an alarm has been triggered on the vehicle or that the ignition 38 has been activated by an unauthorized user. Other options, such as, remote engine kill, car starter and remote door locks can also be used as well.

The optional IO circuit 36 can also be connected to an audio source 39 such as a hidden microphone to enable the security service provider to hear any conversation the thief might be having in the vehicle.

Figure 3B:
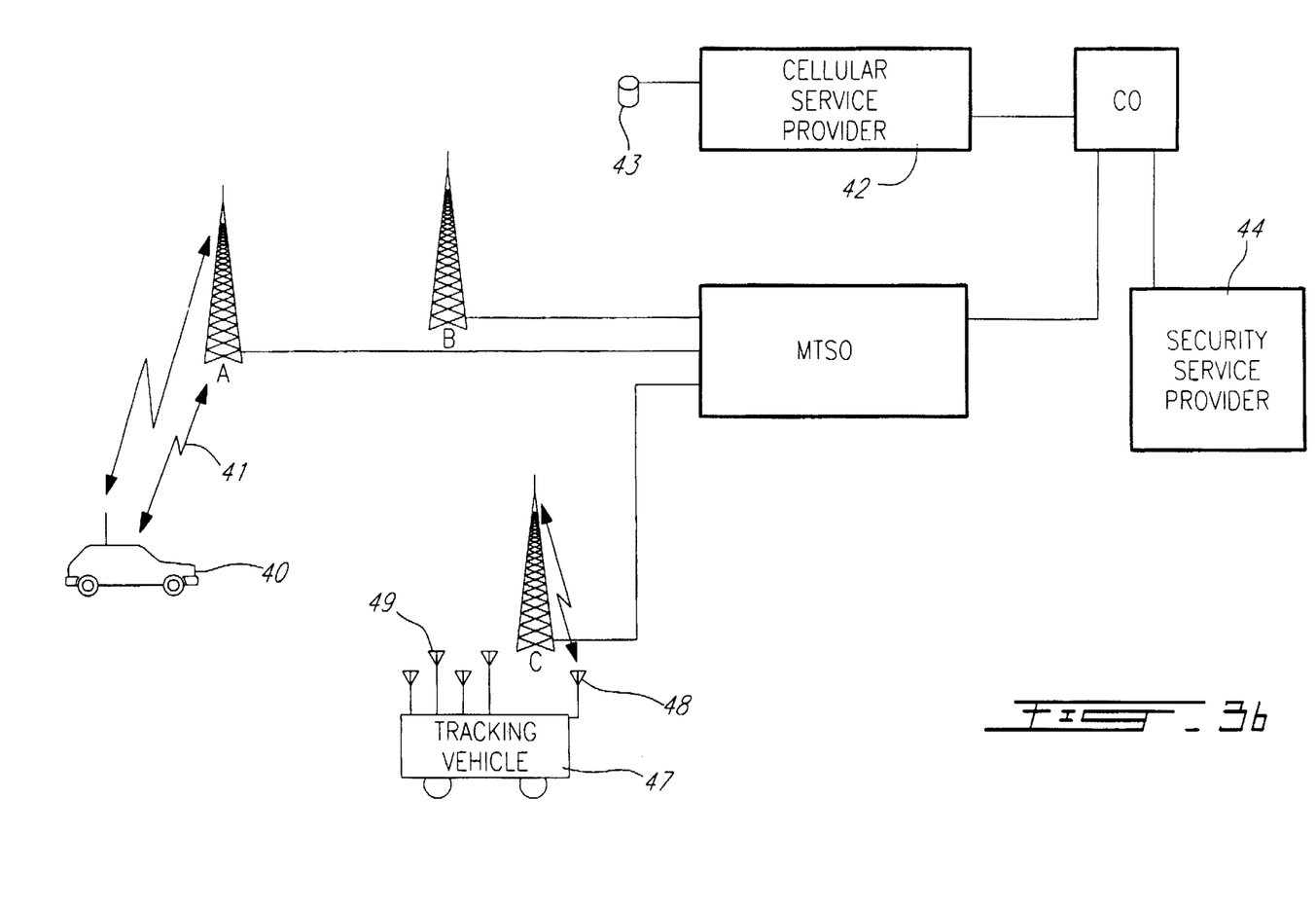
FIG. 3b is an illustration of the vehicle tracking system of the present invention.
Figure 3C:
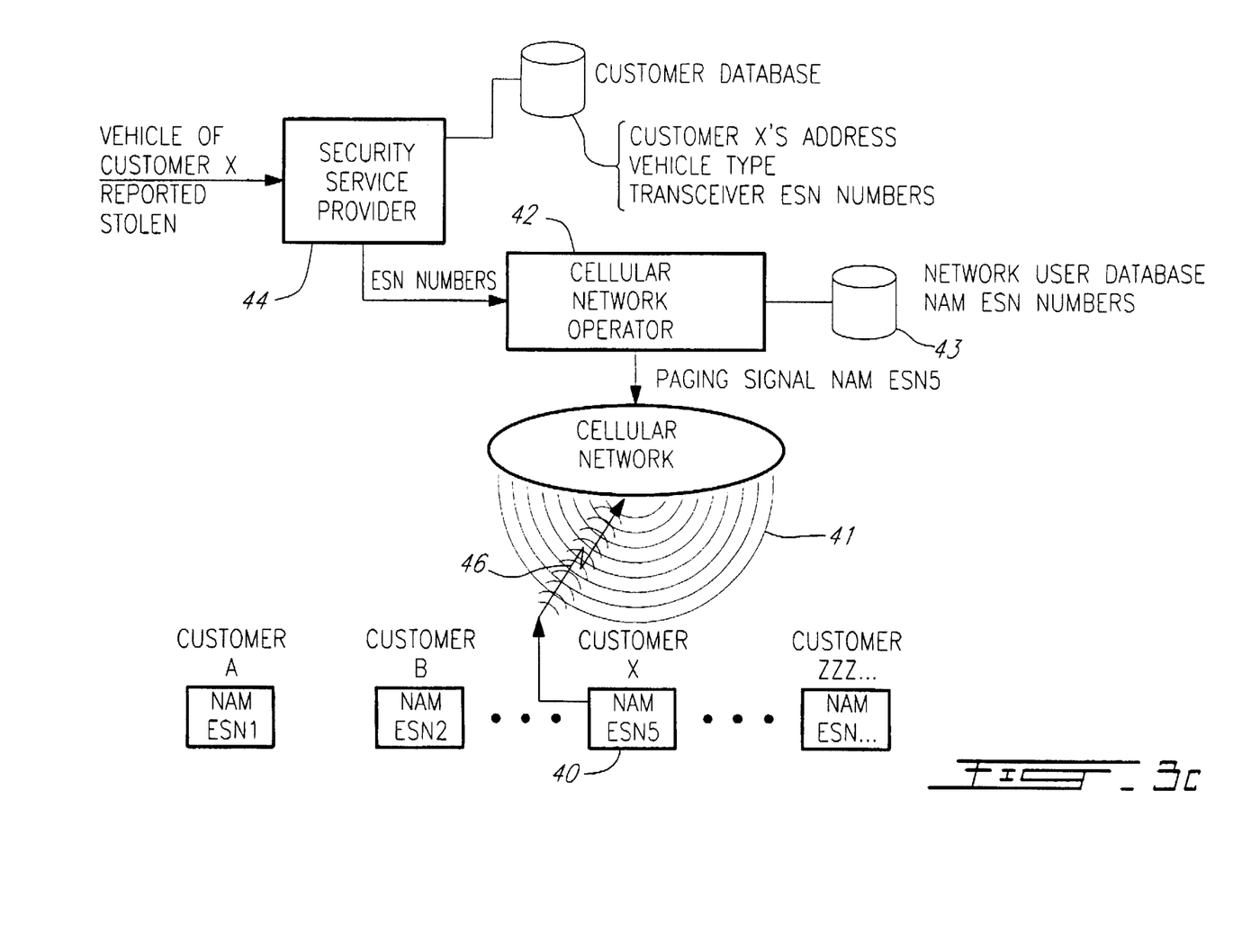
FIG. 3c is a diagram illustrating how a stolen vehicle can be tracked with the system of FIG. 3b.

Referring now to FIGS. 3b and 3c, we have shown a diagram illustrating the vehicle tracking system of the present invention. In order to be provided with the vehicle tracking service of the present invention, a vehicle operator would first have the locating cellular transceiver illustrated in FIG. 3a installed in the vehicle. The locating cellular transceiver would be provided, as any other cellular telephone, with an electronic serial number (ESN) unique to the transceiver. The identity of the vehicle owner or operator and the transceiver's Electronic Serial Number (ESN) are added to a customer database of the security service provider. The installation of the locating cellular transceiver and registration of the ESN would of course be done via a security service provider authorized by the cellular service provider to assign new cellular accounts, such as is currently done with the purchase of cellular phones.

Normally, when calls to and from a cellular transceiver are made, the cellular network will verify the cellular transceiver's 10-digit telephone number (NAM, Number Assigned Mobile) and ESN (Electronic Serial Number) before allowing the call to go through. Each cellular telephone is provided with a unique telephone number (NAM) which corresponds to a unique ESN.

With the system of the present invention, the locating cellular transceiver will still provide its ESN when queried by the network. However, in order to reduce the costs associated with offering the vehicle locating service, a single NAM is used for all or a group of locating transceivers. As will be described further below, only the locating transceiver having the correct ESN will respond to queries from the cellular network, even if each locating transceiver makes use of the same NAM.

Once the locating cellular transceiver is installed and in operation, the user becomes registered with the security service provider. The security provider enters the locating transceiver's ESN in a database with the customer's personal information, such as residential address, telephone number, vehicle description and serial number, etc. The cellular transceiver which is now hidden in vehicle 40 operates in a passive or standby mode within the cellular network infrastructure. From time to time, at predetermined intervals, the locating cellular transceiver will be queried by the network to provide an indication of its location within the network. For example, in FIGS. 3b and 3c, the locating cellular transceiver of vehicle 40 will be paged from time to time over a paging channel 41. The paging request is generated from any one of the cell sites A, B or C. Upon receiving the paging request, the locating cellular transceiver switches over to an active mode to transmit a response to the nearest cell site to identify amongst other things, the signal quality or RSSI level. This way, the cellular service provider 42 can keep track of various cellular telephones within the network and their locations, such that when an incoming call arrives, the call can be directed to a cell site located nearest to the cellular telephone user. This information is updated from time to time in a database 43. The response may or may not be used by the network, according to the need to keep track of individual transceivers.

When the security service provider 44 receives an indication that vehicle 40 has been stolen, a call is made to a cellular service provider to request a standard change of ESN. The ESN corresponding to that of the cellular transceiver located in the stolen car is programmed in the database 43 to match the pre-established common NAM. At this point, a preliminary query is made to determine the current location of the stolen vehicle 40 within the cellular network. As in the prior art, a general estimate of the location of stolen vehicle 21 can be determined, say, within a 120° area of a cellular cluster such as shown in FIG. 2a, namely by identifying the cell site sector communicating with the transceiver. The security service provider dials the pre-selected telephone number, i.e. common NAM associated with locating cellular transceivers. The call is processed as a normal incoming cellular call by the network operator. The cellular network operator receives the dialed digits, checks its database for the associated ESN (now equivalent to ESN of stolen vehicle), then transmits, on the cellular network, a new paging signal containing the common NAM and unique ESN of the stolen vehicle. The only transceiver to respond will be the one associated with the stolen vehicle and a voice channel illustrated by arrow 46 is opened between the locating cellular transceiver of vehicle 40 and a nearby cell site. This voice channel is kept open, as if a normal conversation was taking place. However, the security service provider is now in control of the opened voice channel and will keep it open until the vehicle is located. In this example, cell site A is currently communicating with the transceiver over voice channel 46. Then, the security service provider 44 forwards the identity of the stolen vehicle to a security response team located in tracking vehicle 47. The team is provided with the current location of vehicle 40 based on the closest cell site sector where the vehicle is located. That information may either be provided by means of a building name, where the antenna cell site sector antenna is located, a street address, or in the preferred embodiment, by means of a latitude and longitude coordinates provided by a global positioning system. The GPS system is used by tracking vehicle 47 to establish its position with respect to the cell site sector that has been identified.

Once the identity and general location of the stolen vehicle is received at the tracking vehicle 47, the tracking vehicle can monitor the open voice channel 46 and travel in the general direction identified by the security service provider. Once the tracking vehicle 47 reaches the general location of the stolen vehicle, the security response team makes use of a radio direction finder which is tuned to the voice channel 46 to precisely identify the location of the stolen vehicle. Once the precise location of the stolen vehicle has been confirmed, the security response team can alert the authorities to recover the vehicle.

The tracking vehicle 47 is provided with a cellular telephone system to communicate with the security service provider 44. The radio direction finder consists of a number of antennae 49 connected to radio direction finder equipment to locate precisely the direction of arrival of an RF signal emitted by the stolen vehicle on the voice channel 46 and received by cell site A as well as tracking vehicle 47.

Figure 4A:
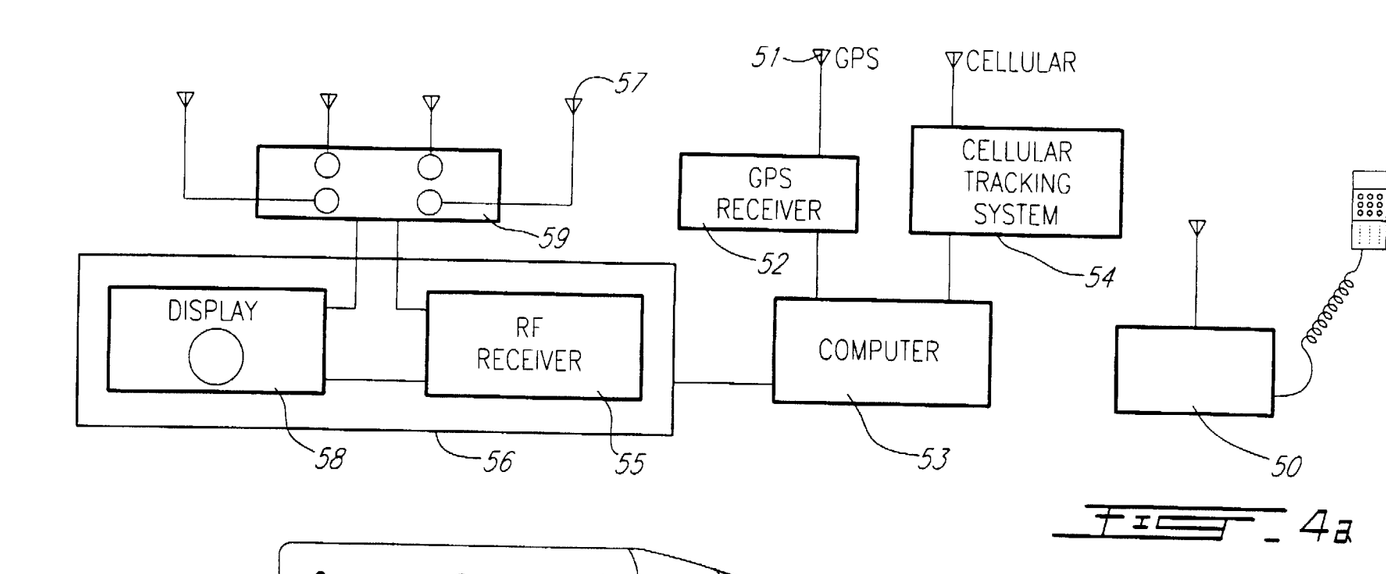
FIG. 4a is a block diagram of the vehicle tracking equipment provided on a search vehicle.

Referring now to FIG. 4a, we have shown a block diagram of the vehicle tracking equipment which is provided in the tracking vehicle and which is used by the security response team to track the precise location of the stolen vehicle. The equipment includes a standard cellular transceiver 50 which enables the security response team to communicate with the security service provider to coordinate the search and tracking of the stolen vehicle. As indicated above, the vehicle may be provided with a GPS antenna 51 connected to a GPS receiver 52 and computer 53 to enable the operator to determine the location of the tracking vehicle with respect to the coordinates of the cell site communicating with the stolen vehicle. GPS receiver 52 will provide a direction the tracking vehicle should follow in order to reach the cell site. This is achieved by entering the coordinates of the cell site. The GPS receiver 52 can then provide an indication of the route to follow to the tracking vehicle which receives positioning data from a satellite via GPS antenna 51.

Figure 4B:
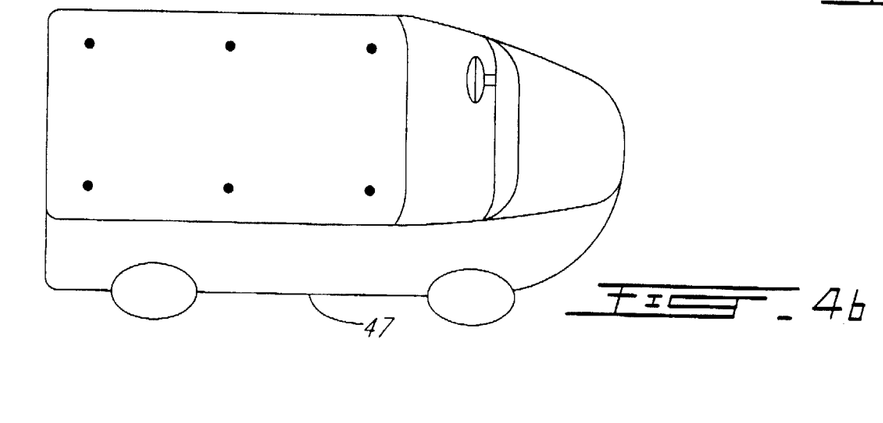

Once the tracking vehicle is dispatched and rolling towards the cell site serving or communicating with the cellular transceiver of the stolen vehicle, the specialized cellular band RF receiver 55 locks onto the forward voice channel 41 (the frequency used to communicate from the tower to the cellular transceiver) currently in use based on the combination of ESN and NAM or a specified channel pointed out by the operators at the MTSO. The four quarter wave antenna of the radio direction finder 56 can then determine the direction of arrival of the RF signal emitted by the cellular tower. This provides the recovery team with a bearing towards the cell tower A (FIG. 3b) if necessary. Once in the vicinity, the RF receiver is set to the reverse voice channel (the frequency used to communicate from the cellular transceiver to the tower) 41. This is done by dropping the frequency by exactly 45 Mhz. on the tuner. The information provided by the quarter wave antennae 57 can then be used at a display or monitor 58 to determine the exact location of the stolen vehicle. As shown in FIG. 4b, the four quarter wave antennae are mounted at the corners of a square on the roof of a tracking vehicle 47. The output of each of the quarter wave antennae are fed into an antenna adder/coupler 59 and applied to the input of RF receiver 55.

A radio direction finder such as described above is available from Doppler Systems Inc.

The cellular tracking system as identified at reference numeral 54 is available from Allen Telecom Group Inc.

We claim:

1. A method of locating a stolen vehicle provided with a locating cellular transceiver, using the existing cellular network infrastructure, comprising the steps of:
   receiving an indication that said vehicle has been stolen;
   receiving transmitted signals from said cellular transceiver at one or more cell cites within operational range of said cellular transceiver, establishing and maintaining an open voice channel with said locating cellular transceiver of said stolen vehicle;
   determining a cell site sector within said network in which the stolen vehicle is located based on the location of said one or more cell sites communicating with said locating cellular transceiver;
   determining a general geographical location of a search vehicle with respect to said one or more cell sites;
   despatching said search vehicle to said cell site sector of said stolen vehicle and monitoring said open voice channel from said search vehicle; and
   locating said stolen vehicle based on the direction of arrival of RF signals emitted by said cellular transceiver in said stolen vehicle and received at said search vehicle.

2. A method as defined in claim 1, further comprising the step of querying the cellular network for the general location of said stolen vehicle, based on the last known location of said vehicle in said cellular network.

3. A method as defined in claim 2, wherein said step of querying comprises determining the Electronic Serial Number (ESN) of said locating cellular transceiver associated with said stolen vehicle and assigning said ESN with a predetermined Number Assigned Mobile (NAM) such that the locating cellular transceiver associated with the stolen vehicle can be paged by said existing cellular network.

4. A method as defined in claim 1, wherein said search vehicle monitors the transmit frequency of said open voice channel.

5. A method as defined in claim 4, wherein said search vehicle locates said stolen vehicle using a radio frequency direction finder tuned to said transmit frequency of said open voice channel.

6. A method as defined in claim 5, wherein said locating cellular transceiver is on a full-time standby mode until an indication that said vehicle has been stolen is received.

7. A method as defined in claim 6, wherein said locating cellular transceiver is switched to an active mode to open said voice channel, until said stolen vehicle is located.

8. A method as defined in claim 1, wherein the location of said search vehicle with respect to said one or more cell sites is determined by downloading the longitude and latitude coordinates of one of said sites into a GPS receiver mounted on said search vehicle.

9. A system for locating a stolen vehicle provided with a locating cellular transceiver, said system operating using the existing cellular network infrastructure, comprising:
   means for receiving an indication that said vehicle has been stolen;
   cellular radio means for maintaining an open voice channel with said locating cellular transceiver of said stolen vehicle;
   means for determining a cell site sector within said network in which the stolen vehicle is located based on the location of one or more cell sites communicating with said locating cellular transceiver;

locator means for determining a general geographical location of a search vehicle with respect to said one or more cell sites;

radio means for monitoring said open voice channel from said search vehicle; and radio location finder means for locating said stolen vehicle based on the direction of arrival of RF signals emitted by said cellular radio means in said stolen vehicle and received at said search vehicle.

10. A method as defined in claim 1, further comprising a step of paging said locating cellular transceiver.

* * * * *